(12) United States Patent
Marocchini et al.

(10) Patent No.: US 9,784,184 B2
(45) Date of Patent: Oct. 10, 2017

(54) SELF-ACTUATED, IN-LINE BLEED VALVE

(71) Applicant: Hamilton Sundstrand Corporation, Charlotte, NC (US)

(72) Inventors: Francis P. Marocchini, Somers, CT (US); Robert Goodman, West Hartford, CT (US); Aaron F. Rickis, Feeding Hills, MA (US); Glenn Gradischer, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 284 days.

(21) Appl. No.: 14/658,640

(22) Filed: Mar. 16, 2015

(65) Prior Publication Data

US 2016/0273450 A1  Sep. 22, 2016

(51) Int. Cl.
*F02C 6/08* (2006.01)
*F02C 9/52* (2006.01)
*F16K 15/02* (2006.01)
*F01D 17/10* (2006.01)
*F04D 27/02* (2006.01)
(Continued)

(52) U.S. Cl.
CPC .............. *F02C 6/08* (2013.01); *F01D 17/105* (2013.01); *F02C 9/18* (2013.01); *F02C 9/52* (2013.01); *F04D 27/0215* (2013.01); *F16K 1/126* (2013.01); *F16K 15/026* (2013.01); *Y10T 137/3367* (2015.04)

(58) Field of Classification Search
CPC ...... F02C 6/08; F02C 9/52; F02C 9/18; F04D 27/2015; F16K 1/126; F16K 15/026; Y10T 137/3367
See application file for complete search history.

(56) References Cited

U.S. PATENT DOCUMENTS 3,092,132 A * 6/1963 Guy .......................... F16K 1/12
137/219
3,586,033 A * 6/1971 Hieber ................... B64D 39/06
137/220
(Continued)

FOREIGN PATENT DOCUMENTS

DE        1224578 B    9/1966

OTHER PUBLICATIONS

Extended European Search Report for EP Application No. 16160634.8, dated Jul. 21, 2016, 7 pages.

*Primary Examiner* — Craig Schneider
*Assistant Examiner* — Kevin Barss
(74) *Attorney, Agent, or Firm* — Kinney & Lange, P.A.

(57) ABSTRACT

A bleed valve assembly includes a flow duct with an inlet and an outlet disposed downstream from the inlet. The outlet is smaller in cross-sectional area than a region of the flow duct disposed between the inlet and the outlet. A piston housing is disposed inside the flow duct between the inlet and the outlet so as to form an annular flow passage between the flow duct and the piston housing. The piston housing is axially aligned with a center axis of the flow duct. At least one rib extends between the flow duct and the piston housing. A sleeve piston is disposed inside the piston housing and is configured to extend downstream of the piston housing in a closed position. The sleeve piston comprises an outer wall that is at least the same in cross-sectional area as the outlet of the flow duct.

9 Claims, 3 Drawing Sheets

(51) Int. Cl.
*F02C 9/18* (2006.01)
*F16K 1/12* (2006.01)

(56) References Cited

U.S. PATENT DOCUMENTS

| | | | | |
|---|---|---|---|---|
| 3,734,120 | A | * | 5/1973 | Rowe .................... G05D 16/106 137/220 |
| 3,792,716 | A | * | 2/1974 | Sime ........................ F16K 1/126 137/220 |
| 3,825,026 | A | | 7/1974 | Piecuch et al. |
| 3,865,128 | A | | 2/1975 | Zadoo |
| 3,915,587 | A | * | 10/1975 | Rannenberg ........ F04D 27/0215 137/484 |
| 4,610,265 | A | * | 9/1986 | Nelson .................... F16K 1/126 137/219 |
| 6,446,657 | B1 | | 9/2002 | Dziorny et al. |
| 8,814,498 | B2 | | 8/2014 | Goodman et al. |
| 2016/0237913 | A1 | * | 8/2016 | Marocchini ........... F01D 17/105 |

* cited by examiner

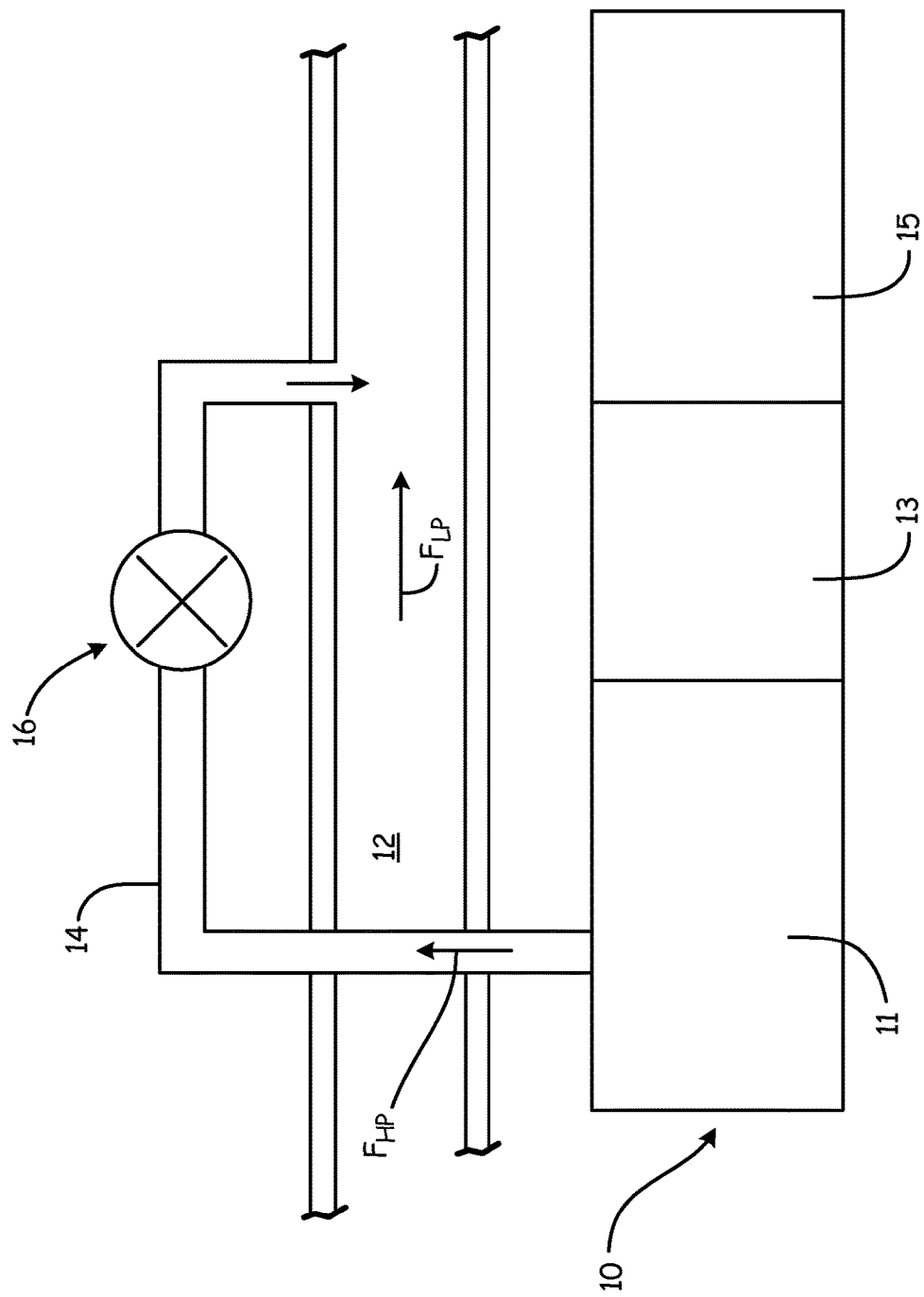

SELF-ACTUATED, IN-LINE BLEED VALVE

BACKGROUND

The present disclosure relates to a self-actuated bleed valve for assisting start-up of a gas turbine engine.

Gas turbine engines are provided with a number of functional sections, including a fan section, a compressor section, a combustion section, and a turbine section. Air and fuel are combusted in the combustion section. The products of the combustion section move downstream, and pass over a series of turbine rotors in the turbine section, thereby driving the turbine rotors to provide power. The turbine rotors in the turbine section drive the compressor section and the fan section.

At start-up, the turbine section of the gas turbine engine takes time to fully provide power to the compressor section and fan section. Thus, driving the compressor section at start-up is more challenging for the turbine section than at steady state conditions. Prior art gas turbine engines generally include a bleed valve to bleed air away from the compressor section during start-up to reduce the load the turbine section experiences from the compressor section. The valve is open at start-up and moved to a closed position after start-up has been completed.

At least some prior art bleed valves include a poppet valve design that requires a large geometric area to meet a specified flow effective area. The large geometric area required by these poppet bleed valves can create a relatively tortuous flowpath for the air traveling through the poppet bleed valves which leads to undesirable pressure losses. Furthermore, the poppet bleed valves are generally mounted to a bulkhead or duct in a cantilever fashion which can be prone to vibration issues.

SUMMARY

In one aspect of the invention, a bleed valve assembly includes a flow duct with an inlet and an outlet disposed downstream from the inlet. The outlet is smaller in cross-sectional area than a region of the flow duct disposed between the inlet and the outlet. A piston housing is disposed inside the flow duct between the inlet and the outlet so as to form an annular flow passage between the flow duct and the piston housing. The piston housing is axially aligned with a center axis of the flow duct. At least one rib extends between the flow duct and the piston housing. A sleeve piston is disposed inside the piston housing and is configured to extend downstream of the piston housing in a closed position. The sleeve piston comprises an outer wall that is at least the same in cross-sectional area as the outlet of the flow duct.

In another aspect of the invention, a bleed valve assembly includes a flow duct with an inlet and an outlet disposed downstream from the inlet. The outlet is smaller in cross-sectional area than a region of the flow duct disposed between the inlet and the outlet. A guide rod is disposed inside the flow duct and extends between the inlet and the outlet of the flow duct along a center axis of the flow duct. At least one rib extends between the flow duct and an upstream end of the guide rod to connect the guide rod to the flow duct. An end cap is connected to a downstream end of the guide rod and a sleeve piston is disposed entirely inside the flow duct and on the guide rod between the end cap and the at least one rib. The sleeve piston includes a center bore configured to receive the guide rod. The sleeve piston further includes an outer wall larger in cross-sectional area than the end cap and at least the same in cross-sectional area as the outlet of the flow duct. The sleeve piston also includes a working surface extending between the center bore and the outer wall. The bleed valve assembly also includes a spring disposed around the guide rod and compressed between the end cap and the sleeve piston.

Persons of ordinary skill in the art will recognize that other aspects and embodiments of the present invention are possible in view of the entirety of the present disclosure, including the accompanying figures.

BRIEF DESCRIPTION OF THE DRAWINGS

FIG. 1 is a schematic diagram of a gas turbine engine core, a bypass stream, a bleed duct, and bleed valve assembly.

Figure 2A:
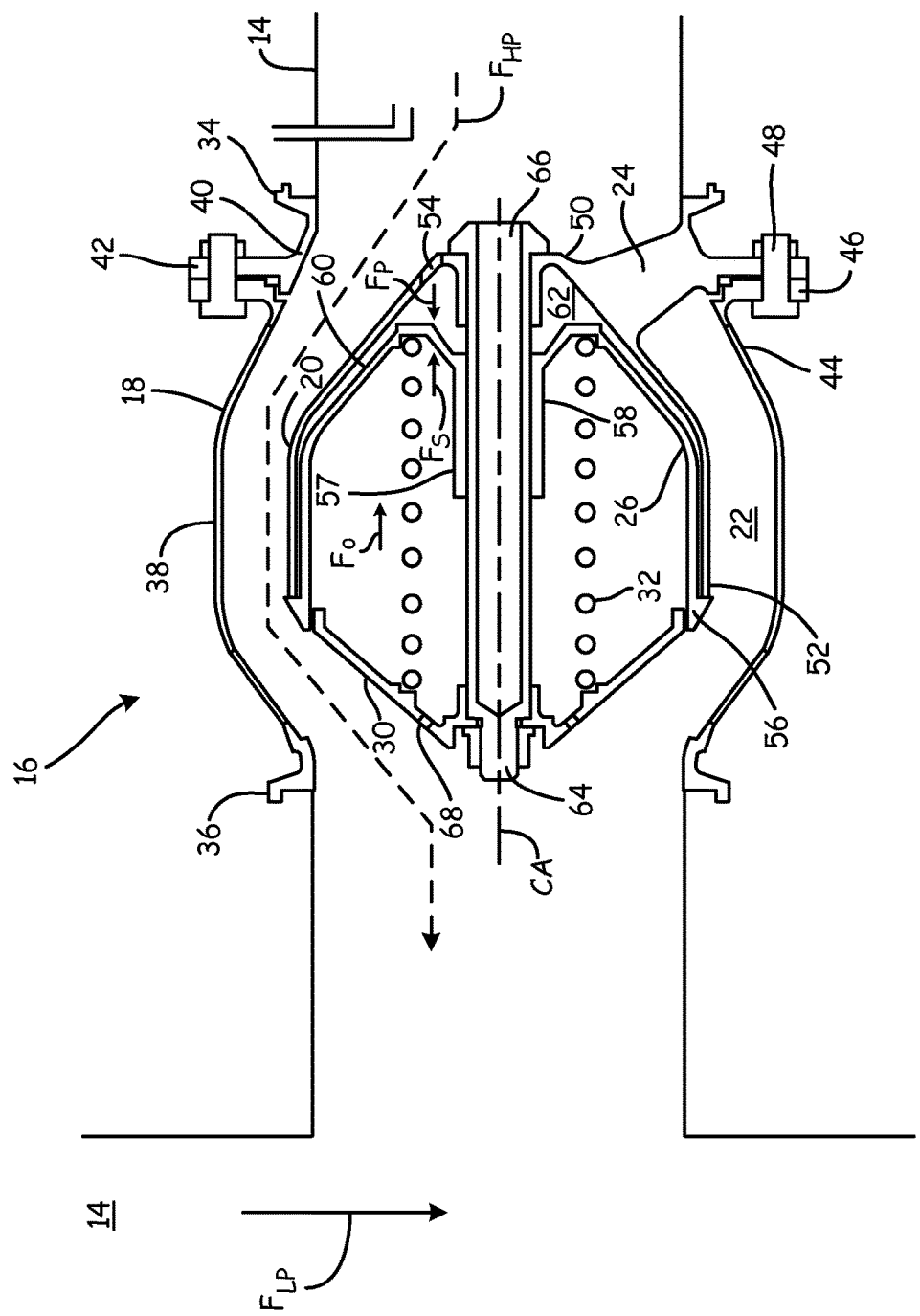
FIG. 2A is a cross-sectional view of a self-actuated inline bleed valve in an open position.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a self-actuated bleed valve assembly that is disposed in-line with a flow duct for bleeding air from a compressor stage of a gas turbine engine at start-up. The flow duct forms the inlet and outlet of the bleed valve assembly, the outlet being disposed downstream from the inlet. A piston housing is disposed inside the flow duct between the inlet and the outlet and is axially aligned with a center axis of the flow duct. The piston housing forms an annular flow passage inside the flow duct. A sleeve piston is disposed inside the piston housing and is configured to extend downstream of the piston housing in a closed position. The bleed valve assembly can incorporate a spring between the piston housing and the sleeve piston to keep the sleeve piston at an open position during start-up of the gas turbine engine. As described below with reference to the Figures, the bleed valve assembly of the present disclosure forms a relative streamlined flowpath that reduces the pressure losses associated with prior art bleed valves. The bleed valve assembly of the present disclosure also weighs less and uses a smaller installation envelope than prior art bleed valves.

FIG. 1 is a schematic diagram of gas turbine engine core 10, bypass stream 12, bleed duct 14, and bleed valve assembly 16. During operation, high pressure fluid $F_{HP}$ flows through gas turbine engine core 10 and lower pressure fluid $F_{LP}$ travels through bypass stream 12. High pressure fluid $F_{HP}$ and lower pressure fluid $F_{LP}$ can both be air, and high pressure fluid $F_{HP}$ travels through gas turbine engine core 10 at a higher pressure than the pressure at which lower pressure fluid $F_{LP}$ travels through bypass stream 12. Gas turbine engine core 10 can be a conventional gas turbine engine core with compressor section 11, combustion section 13, and turbine section 15 that drives compressor section 11.

Bypass stream 12 can be a conventional gas turbine engine bypass duct disposed radially outward from gas turbine engine core 10. Alternatively, bypass stream 12 can simply be a vent to atmosphere. Bleed duct 14 fluidically connects compressor section 11 of gas turbine engine core 10 to bypass stream 12. Bleed valve assembly 16 is connected in-line to bleed duct 14 and controls the flow of fluid through bleed duct 14. At start-up, bleed valve assembly 16 is at an open position so that at least a portion of high pressure fluid $F_{HP}$ in compressor section 11 can bleed away through bleed duct 14 to bypass stream 12. By allowing high pressure fluid $F_{HP}$ to bleed away from compressor section 11 of gas turbine engine core 10 to bypass stream 12 at start-up, bleed duct 14 and bleed valve assembly 16 reduce the load turbine section 15 experiences from compressor section 11. Once start-up is complete and turbine section 15 is fully powering compressor section 11, bleed valve assembly 16 self-actuates to a closed position to stop the flow of high pressure fluid $F_{HP}$ through bleed duct 14. When gas turbine engine core 10 is powered-down, bleed valve assembly 16 self-actuates back to the open position to await the next instance of start-up of gas turbine engine core 10. An embodiment of bleed valve assembly 16 is discussed below with reference to FIGS. 2A and 2B.

Figure 2B:
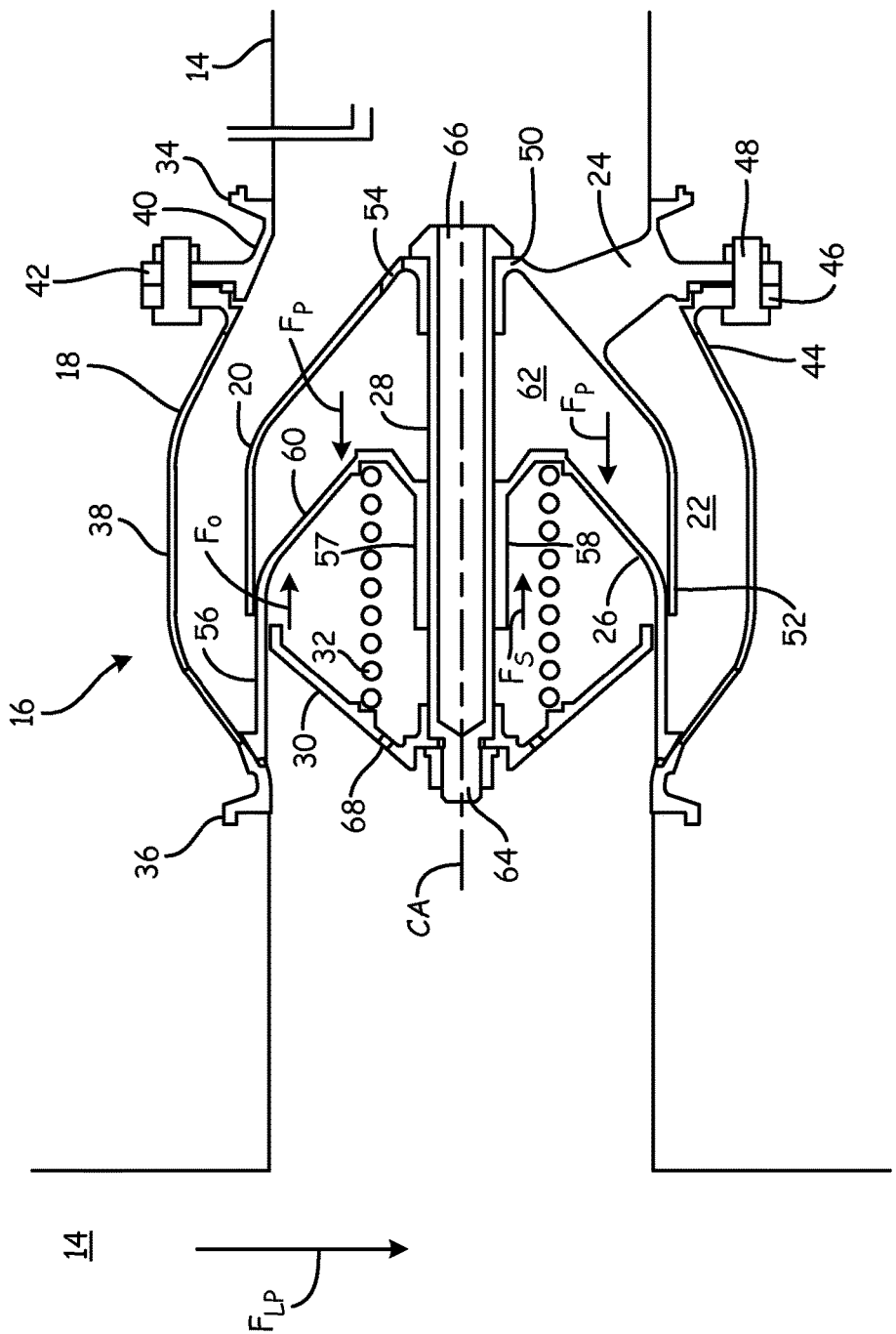
FIG. 2B is a cross-sectional view of the self-actuated inline bleed valve of FIG. 2A in a closed position.

FIGS. 2A-2B will be discussed concurrently. FIG. 2A is a cross-sectional view of bleed valve assembly 16 in an open position and FIG. 2B is a cross-sectional view of bleed valve assembly 16 in a closed position. As shown in FIGS. 2A-2B, bleed valve assembly 16 can include flow duct 18, piston housing 20, annular flow passage 22, ribs 24, sleeve piston 26, guide rod 28, end cap 30, and spring 32. Flow duct 18 forms inlet 34 and outlet 36 of bleed valve assembly 16 and flow duct 18 can include intermediate region 38, center axis CA, upstream section 40 with first flange 42, downstream section 44 with second flange 46, and connecting elements 48. Piston housing 20 can include upstream end 50, downstream end 52, and holes 54. Sleeve piston 26 can include outer wall 56, hub 57, center bore 58, and working surface 60. Bleed valve assembly 16 can also include gap 62. Guide rod 28 can include downstream end 64 and upstream end 66. End cap 30 can include holes 68. Inlet pressure load $F_P$, preload force $F_s$, and outlet pressure load $F_o$ are also shown in FIGS. 2A and 2B.

As shown in FIGS. 2A and 2B, flow duct 18 of bleed valve assembly 16 is disposed in-line with bleed duct 14 and can form a portion bleed duct 14. Because flow duct 18 of bleed valve assembly 16 is disposed in-line with bleed duct 14, both inlet 34 and outlet 36 of flow duct 18 are aligned along center axis CA of flow duct 18. Outlet 36 is disposed downstream from inlet 34 and intermediate region 38 extends between inlet 34 and outlet 36.

Flow duct 18 can be divided into upstream section 40 and downstream section 44 to increase the ease of manufacturing and assembling bleed valve assembly 16 by allowing easier access to the interior of flow duct 18. Upstream section 40 can form inlet 34 of flow duct 18 and includes first flange 42. Downstream section 44 can be longer than upstream section 40 and can form intermediate region 38 and outlet 36. Downstream section 44 can also include second flange 46. Second flange 46 can be configured to abut first flange 42 and connecting elements 48 can connect first flange 42 and second flange 46 together. Connecting elements 48 can be selected from but is not limited to the group consisting of bolts, nuts, screws, pins, rivets, and/or combinations thereof.

Piston housing 20 is disposed entirely inside flow duct 18 and can also be axially aligned with center axis CA of flow duct 18 such that center axis CA can form the center axis for both flow duct 18 and piston housing 20. Piston housing 20 can be positioned within intermediate region 38 of flow duct 18 between inlet 34 and outlet 36. Intermediate region 38 can be larger in cross-sectional area than both outlet 36 and inlet 34 so as to accommodate piston housing 20 without decreasing the cross-sectional flow area inside flow duct 18 between inlet 34 and outlet 36. Intermediate region 38 of flow duct 18 is sufficiently larger in cross-sectional area than piston housing 20 so as to form annular flow passage 22 between flow duct 18 and piston housing 20.

Upstream end 50 of piston housing 20 can be disposed proximate inlet 34 of flow duct 18. Ribs 24, only one of which is shown in FIGS. 2A and 2B, can extend from upstream section 40 of flow duct 18 to upstream end 50 of piston housing 20 to both connect and space piston housing 20 from flow duct 18. Piston housing 20, ribs 24, and upstream section 40 of flow duct 18 can all be connected and formed as a single integral part. Downstream end 64 of piston housing 20 is disposed downstream from upstream end 66 of piston housing 20 and forms an opening for receiving sleeve piston 26.

Guide rod 28 can be disposed inside piston housing 20 and can extend between inlet 34 and outlet 36 of flow duct 18 along center axis CA. Upstream end 66 of guide rod 28 can be connected to and supported by upstream end 50 of piston housing 20. Guide rod 28 can extend from upstream end 50 of piston housing 20 towards outlet 36 of flow duct 18 along center axis CA. Guide rod 28 can serve as a slide track to guide the movement of sleeve piston inside piston housing 20 and flow duct 18.

Sleeve piston 26 is disposed entirely inside flow duct 18 and at least partially inside piston housing 20 on guide rod 28. Hub 57 of sleeve piston 26 is disposed at an axial center of sleeve piston 26. Center bore 58 can extend axially through hub 57 of sleeve piston 26 and can be configured to receive guide rod 28. When sleeve piston 26 is assembled inside piston housing 20, hub 57 and center bore 58 are axially aligned with center axis CA. Outer wall 56 of sleeve piston 26 can be disposed radially outward from hub 57 and can form an outer diameter of sleeve piston 26 relative center axis CA. Outer wall 56 of sleeve piston 26 is at least the same in cross-sectional area as outlet 36 of flow duct 18 so that outer wall 56 can close annular flow passage 22 proximate outlet 36 when sleeve piston 26 is extended downstream of piston housing 20 to the closed position. Working surface 60 extends between hub 57 and outer wall 56 of sleeve piston 26 and can connect outer wall 56 to hub 57.

End cap 30 can be connected to downstream end 64 of guide rod 28 so as to axially limit movement of sleeve piston 26 on guide rod 28 between end cap 30 and upstream end 50 of piston housing 20. Outer wall 56 of sleeve piston 26 can be larger in diameter than end cap 30 and so that outer wall 56 can be disposed radially between end cap 30 and downstream end 52 of piston housing 20 relative center axis CA. Spring 32 can be disposed around guide rod 28 and compressed between end cap 30 and working surface 60 of sleeve piston 26. Spring 32 can be a coil spring or any other kind of spring suitable for exerting a force opposite working surface 60 of sleeve piston 26 and a force against end cap 30. As shown in FIG. 2A, spring 32 biases sleeve piston 26 such that sleeve piston 26 is at the open position during engine start-up and during engine rest.

To streamline bleed valve assembly 16 and reduce pressure losses at inlet 34 of bleed valve assembly 16, upstream end 50 of piston housing 20 can taper inward in an upstream direction. To accommodate the taper in upstream end 50 of piston housing 20, working surface 60 of sleeve piston 26 can also taper inward in the upstream direction such that working surface 60 mates with upstream end 50 of piston housing 20. End cap 30 can taper inward in a downstream direction to reduce turbulence and pressure losses proximate outlet 36.

Holes 54, only one of which is shown in FIGS. 2A and 2B, are formed in upstream end 50 of piston housing 20 and are in fluidic communication with inlet 34 of flow duct 18. Gap 62 can be disposed between working surface 60 of sleeve piston 26 and upstream end 50 of piston housing 20. As shown in FIGS. 2A and 2B, gap 62 can be in fluidic communication with holes 54 of upstream end 50 of piston housing 20. Holes 68 can be formed in end cap 30 and can be in fluidic communication with outlet 36 of flow duct 18.

During engine start-up, sleeve piston 26 is at the open position, as shown in FIG. 2A, and high pressure fluid $F_{HP}$ flows from engine core 10 (shown in FIG. 1) through bleed duct 14. High pressure fluid $F_{HP}$ then enters flow duct 18 of bleed valve assembly 16 by way of inlet 34. As high pressure fluid $F_{HP}$ flows from inlet 34 into annular flow passage 22, a portion of high pressure fluid $F_{HP}$ passes through holes 54 of upstream end 50 of piston housing 20 and enters gap 62. The portion of high pressure fluid $F_{HP}$ that enters into gap 62 exerts an inlet pressure load $F_P$ across working surface 60 of sleeve piston 26. Inlet pressure load $F_P$ can be representative of the static fluid pressure of high pressure fluid $F_{HP}$ entering bleed valve assembly 16 from engine core 10. During engine start-up, inlet pressure load $F_P$ across working surface 60 of sleeve piston 26 is lower than spring preload force $F_s$, spring preload force $F_s$ being a force exerted by spring 32 to bias sleeve piston 26 to the open position.

After high pressure fluid $F_{HP}$ enters annular flow passage 22, high pressure fluid $F_{HP}$ flows through annular flow passage 22 and then exits bleed valve assembly 16 through outlet 36 of flow duct 18. Once high pressure fluid $F_{HP}$ passes through outlet 36, high pressure fluid $F_{HP}$ enters bypass stream 12 where it joins lower pressure fluid $F_{LP}$ inside bypass stream 12. As discussed above with reference to FIG. 1, bypass stream 12 is generally at a lower pressure than engine core 10. Holes 68 formed in end cap 30 allow the space inside end cap 30 and sleeve piston 26 to be open to an outlet pressure load $F_o$ at outlet 36. Outlet pressure load $F_o$ at outlet 36 can be representative of the static fluid pressure of lower pressure fluid $F_{LP}$ inside bypass stream 12. Alternatively, outlet pressure load $F_o$ felt inside end cap 30 and sleeve piston 26 can be less than the static fluid pressure of lower pressure fluid $F_{LP}$ inside bypass stream 12 due to the velocity effect of high pressure fluid $F_{HP}$ flowing across holes 68. Together, inlet pressure load $F_P$ and outlet pressure load $F_o$ create a sensing pressure differential across sleeve piston 26 which can be used to determine the value of spring preload force $F_s$ that should be incorporated into spring 32 so that sleeve piston 26 moves to the close position at the appropriate time at the end of engine start-up.

As engine start-up ends, inlet pressure load $F_P$ across working surface 60 of sleeve piston 26 increases such that inlet pressure load $F_P$ exceeds spring preload force $F_s$ and outlet pressure load $F_o$. As inlet pressure load $F_P$ increases and exceeds spring preload force $F_s$, inlet pressure load $F_P$ compresses spring 32 and pushes sleeve piston 26 in the downstream direction. As sleeve piston 26 moves in the downstream direction, outer wall 56 of sleeve piston 26 contacts flow duct 18 and closes annular flow passage 22 such that high pressure fluid $F_{HP}$ can no longer enter bypass stream 12. At the end of the mission or operation cycle of engine core 10, inlet pressure load $F_P$ decreases below spring preload force $F_s$, and spring 32 moves sleeve piston 26 in the upstream direction back to the open position to await the start-up instance engine core 10. Flow duct 18, piston housing 20, sleeve piston 26, guide rod 28, and end cap 30 can all be formed from metal, such as steel, aluminum, titanium, or any other material with the necessary stiffness and durability to withstand the pressures and environment that bleed valve assembly 16 may experience during service.

In view of the foregoing description, it will be recognized that the present disclosure provides numerous advantages and benefits. For example, the present disclosure provides bleed valve assembly 16. Flow duct 18, inlet 34 and outlet 36 of flow duct 18, piston housing 20, and sleeve piston 26 are all disposed in-line along center axis CA. Because flow duct 18, inlet 34 and outlet 36 of flow duct 18, piston housing 20, and sleeve piston 26 are all disposed in-line along center axis CA, the flow path across bleed valve assembly 16 is relatively straight, especially when compared to the tortuous flow paths of prior art bleed valves, thereby reducing the pressure losses associated with prior art bleed valves. Furthermore, the geometry of piston housing 20, sleeve piston 26, and end cap 30 can be tapered so as to further stream line the flow path across bleed valve assembly 16. Bleed valve assembly 16 also uses a smaller installation envelope (the need to move and manipulate bleed valve assembly 16 into position during installation) than prior art bleed valves because piston housing 20 and sleeve piston 26 are disposed completely within flow duct 18 in a compact nature. The compact and elegant design of bleed valve assembly 16 can also allow bleed valve assembly 16 to weigh less than prior art bleed valves, which aides in decreasing the overall weight and fuel consumption of any aircraft engine that incorporates bleed valve assembly 16.

The following are non-exclusive descriptions of possible embodiments of the present invention.

In one embodiment, a bleed valve assembly includes a flow duct with an inlet and an outlet disposed downstream from the inlet. The outlet is smaller in cross-sectional area than a region of the flow duct disposed between the inlet and the outlet. A piston housing is disposed inside the flow duct between the inlet and the outlet so as to form an annular flow passage between the flow duct and the piston housing. The piston housing is axially aligned with a center axis of the flow duct. At least one rib extends between the flow duct and the piston housing. A sleeve piston is disposed inside the piston housing and is configured to extend downstream of the piston housing in a closed position. The sleeve piston comprises an outer wall that is at least the same in cross-sectional area as the outlet of the flow duct.

The bleed valve assembly of the preceding paragraph can optionally include, additionally and/or alternatively, any one or more of the following features, configurations and/or additional components:

a guide rod disposed inside the piston housing, wherein the guide rod extends from an upstream end of the piston housing towards the outlet of the flow duct along a center axis of the piston housing, wherein the sleeve piston comprises both a center bore configured to receive the guide rod and a working surface extending between the center bore and the outer wall of the sleeve piston;

an end cap connected to a downstream end of the guide rod, wherein the end cap is smaller in diameter than a downstream end of the piston housing, wherein the outer wall of the sleeve piston is larger in diameter than the end cap and is disposed radially between the end cap and the downstream end of the piston housing relative the center axis of the piston housing; and/or a spring disposed around the guide rod and compressed between the end cap and the working surface of the sleeve piston.

In another embodiment, a bleed valve assembly includes a flow duct with an inlet and an outlet disposed downstream from the inlet. The outlet is smaller in cross-sectional area than a region of the flow duct disposed between the inlet and the outlet. A guide rod is disposed inside the flow duct and extends between the inlet and the outlet of the flow duct along a center axis of the flow duct. At least one rib extends between the flow duct and an upstream end of the guide rod to connect the guide rod to the flow duct. An end cap is connected to a downstream end of the guide rod and a sleeve piston is disposed entirely inside the flow duct and on the guide rod between the end cap and the at least one rib. The sleeve piston includes a center bore configured to receive the guide rod. The sleeve piston further includes an outer wall larger in cross-sectional area than the end cap and at least the same in cross-sectional area as the outlet of the flow duct. The sleeve piston also includes a working surface extending between the center bore and the outer wall. The bleed valve assembly also includes a spring disposed around the guide rod and compressed between the end cap and the sleeve piston.

The bleed valve assembly of the preceding paragraph can optionally include, additionally and/or alternatively, any one or more of the following features, configurations and/or additional components:

a piston housing disposed inside the flow duct, wherein the piston housing comprises: a first end connected to the at least one rib and the upstream end of the guide rod; and a second end disposed downstream from the first end, wherein the second end forms an opening to receive the sleeve piston;

the first end of the piston housing tapers inward in an upstream direction;

the working surface of the sleeve piston tapers inward in an upstream direction;

the first end of the piston housing comprises at least one hole in fluidic communication with the inlet of the flow duct;

a gap disposed between the working surface of the sleeve piston and the first end of the piston housing, wherein the gap is in fluidic communication with the at least one hole of the first end of the piston housing;

the end cap comprises at least one hole in fluidic communication with the outlet of the flow duct;

the end cap tapers inward in a downstream direction;

the flow duct further comprises: an upstream section forming the inlet of the flow duct and comprising a first flange; a downstream section forming the outlet of the flow duct and comprising a second flange; and a plurality of connecting elements connecting the first flange to the second flange;

the downstream section is longer than the upstream section; and/or the at least one rib is connected to the upstream section.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 2A and 2B show flow duct 18, piston housing 20, sleeve piston 26, and end cap 30 as having a generally circular or cylindrical geometry, flow duct 18, piston housing 20, sleeve piston 26, and end cap 30 can also have an oval or other non-cylindrical geometry without departing from the scope of the invention. In another example, while bleed valve assembly 16 has been described as including piston housing 20, it is envisioned that an embodiment of bleed valve assembly 16 can be made sleeve piston 26 disposed inside flow duct 18 without piston housing 20. In addition, many modifications may be made to adapt a particular situation or material to the teachings of the invention without departing from the essential scope thereof. For example, while bleed valve assembly 16 has been described with reference to gas turbine engines, bleed valve assembly 16 can be used in any application where a self-actuated, in-line bleed valve is needed. Therefore, it is intended that the invention not be limited to the particular embodiment(s) disclosed, but that the invention will include all embodiments falling within the scope of the appended claims.

The invention claimed is:

1. A bleed valve assembly comprising:
    a flow duct comprising:
        an inlet; and
        an outlet disposed downstream from the inlet, wherein the outlet is smaller in cross-sectional area than a region of the flow duct disposed between the inlet and the outlet;
    a piston housing disposed inside the flow duct between the inlet and the outlet so as to form an annular flow passage between the flow duct and the piston housing, wherein the piston housing is axially aligned with a center axis of the flow duct, and wherein the piston housing comprises:
        a first end; and
        a second end disposed downstream from the first end, wherein the second end forms an opening, and wherein the first end of the piston housing comprises at least one hole in fluidic communication with the inlet of the flow duct;
    at least one rib extending between the flow duct and the piston housing, wherein the at least one rib is connected to the first end of the piston housing;
    a guide rod disposed inside the piston housing, wherein the guide rod extends from the first end of the piston housing towards the outlet of the flow duct along a center axis of the piston housing;
    an end cap connected to a downstream end of the guide rod, wherein the end cap is smaller in diameter than the second end of the piston housing, and wherein the end cap comprises at least one hole in fluidic communication with the outlet of the flow duct;
    a sleeve piston disposed inside the opening of the piston housing and configured to extend downstream of the piston housing in a closed position, wherein the sleeve piston comprises an outer wall that is at least the same in cross-sectional area as the outlet of the flow duct, and wherein the sleeve piston further comprises both a center bore configured to receive the guide rod and a working surface extending between the center bore and the outer wall of the sleeve piston, and wherein the outer wall of the sleeve piston is larger in diameter than the end cap and is disposed radially between the end cap and the second end of the piston housing relative the center axis of the piston housing.

2. The bleed valve assembly of claim 1, wherein the bleed valve assembly further comprises:

a spring disposed around the guide rod and compressed between the end cap and the working surface of the sleeve piston.

3. A bleed valve assembly comprising:

a flow duct comprising:
  an inlet; and
  an outlet disposed downstream from the inlet, wherein the outlet is smaller in cross-sectional area than a region of the flow duct disposed between the inlet and the outlet;

a guide rod disposed inside the flow duct and extends between the inlet and the outlet of the flow duct along a center axis of the flow duct;

at least one rib extending between the flow duct and an upstream end of the guide rod to connect the guide rod to the flow duct;

an end cap connected to a downstream end of the guide rod, wherein the end cap comprises at least one hole in fluidic communication with the outlet of the flow duct;

a sleeve piston disposed entirely inside the flow duct and on the guide rod between the end cap and the at least one rib, the sleeve piston comprising;
  a center bore configured to receive the guide rod;
  an outer wall larger in cross-sectional area than the end cap and at least the same in cross-sectional area as the outlet of the flow duct; and
  a working surface extending between the center bore and the outer wall;

a spring disposed around the guide rod and compressed between the end cap and the sleeve piston; and a piston housing disposed inside the flow duct, wherein the piston housing comprises:
  a first end connected to the at least one rib and the upstream end of the guide rod; and
  a second end disposed downstream from the first end, wherein the second end forms an opening to receive the sleeve piston,
  wherein the first end of the piston housing tapers inward in an upstream direction, and wherein the first end of the piston housing comprises at least one hole in fluidic communication with the inlet of the flow duct.

4. The bleed valve assembly of claim 3, wherein the working surface of the sleeve piston tapers inward in an upstream direction.

5. The bleed valve assembly of claim 3, wherein the bleed valve assembly further comprises:

a gap disposed between the working surface of the sleeve piston and the first end of the piston housing, wherein the gap is in fluidic communication with the at least one hole of the first end of the piston housing.

6. The bleed valve assembly of claim 3, wherein the end cap tapers inward in a downstream direction.

7. The bleed valve assembly of claim 3, wherein the flow duct further comprises:

an upstream section forming the inlet of the flow duct and comprising a first flange;

a downstream section forming the outlet of the flow duct and comprising a second flange; and a plurality of connecting elements connecting the first flange to the second flange.

8. The bleed valve assembly of claim 7, wherein the downstream section is longer than the upstream section.

9. The bleed valve assembly of claim 8, wherein the at least one rib is connected to the upstream section.

* * * * *